(12) United States Patent
Peer et al.

(10) Patent No.: US 12,452,660 B2
(45) Date of Patent: Oct. 21, 2025

(54) 4-WAY HANDSHAKE OPTIMIZATION

(71) Applicant: Intel Corporation, Santa Clara, CA (US)

(72) Inventors: Ilan Peer, Modiin (IL); Po-Kai Huang, San Jose, CA (US); Johannes Berg, Detmold (DE); Ido Ouzieli, Tel Aviv (IL); Emily Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 17/358,049

(22) Filed: Jun. 25, 2021

(65) Prior Publication Data

US 2021/0345105 A1   Nov. 4, 2021

(51) Int. Cl.
| | |
|---|---|
| *H04W 12/0433* | (2021.01) |
| *H04W 12/03* | (2021.01) |
| *H04W 12/041* | (2021.01) |
| *H04W 12/0431* | (2021.01) |
| *H04W 12/06* | (2021.01) |
| *H04W 12/69* | (2021.01) |
| *H04W 84/12* | (2009.01) |

(52) U.S. Cl.
CPC ....... *H04W 12/0433* (2021.01); *H04W 12/03* (2021.01); *H04W 12/041* (2021.01); *H04W 12/0431* (2021.01); *H04W 12/06* (2013.01); *H04W 12/69* (2021.01); *H04W 84/12* (2013.01)

(58) Field of Classification Search
CPC ............ H04W 12/0433; H04W 12/03; H04W 12/041; H04W 12/0431; H04W 12/06; H04W 12/69; H04W 84/12
USPC ............................................................ 726/2
See application file for complete search history.

(56) References Cited

U.S. PATENT DOCUMENTS

| | | | | |
|---|---|---|---|---|
| 7,275,157 | B2 * | 9/2007 | Cam Winget | H04W 36/0088 713/168 |
| 8,510,560 | B1 * | 8/2013 | Lambert | H04L 63/06 713/168 |
| 9,380,457 | B2 * | 6/2016 | Walker | H04W 12/03 |
| 10,708,058 | B2 * | 7/2020 | Le Scouarnec | H04W 12/041 |
| 2006/0083200 | A1 * | 4/2006 | Emeott | H04W 12/0433 713/168 |
| 2007/0192600 | A1 * | 8/2007 | Wong | H04L 63/08 713/168 |

(Continued)

*Primary Examiner* — Thanh T Le
(74) *Attorney, Agent, or Firm* — East IP P.C.

(57) ABSTRACT

The application relates to a 4-way handshake optimization. An initiating entity includes processor circuitry configured to: transmit a first open authentication frame to a responding entity via a wireless interface, wherein the first open authentication frame comprises information that helps the responding entity to identify a Pairwise Master Key (PMK) and a first random number; receive a second open authentication frame from the responding entity, wherein the second open authentication frame comprises a second random number; transmit an association request frame to the responding entity via the wireless interface, wherein the association request frame is encrypted with at least part of a Pairwise Transient Key (PTK) derived by the initiating entity from the PMK; and receive an association response frame from the responding entity, wherein the association response frame is encrypted with at least part of the PTK derived by the responding entity from the PMK.

22 Claims, 17 Drawing Sheets

(56) References Cited

U.S. PATENT DOCUMENTS

| | | | | |
|---|---|---|---|---|
| 2007/0280481 A1* | 12/2007 | Eastlake | ............... | H04W 12/50<br>380/277 |
| 2008/0016350 A1* | 1/2008 | Braskich | ................ | H04L 9/321<br>713/169 |
| 2008/0226071 A1* | 9/2008 | Braskich | ............... | H04W 12/50<br>380/258 |
| 2009/0052674 A1* | 2/2009 | Nishida | ................ | H04L 9/0833<br>380/278 |
| 2011/0235802 A1* | 9/2011 | Kokkinen | ............ | H04L 63/205<br>380/247 |
| 2013/0196708 A1* | 8/2013 | Narasimhan | ......... | H04L 9/0827<br>455/525 |
| 2013/0243194 A1* | 9/2013 | Hawkes | ............... | H04L 9/0838<br>380/270 |
| 2013/0263223 A1* | 10/2013 | Cherian | ............... | H04L 9/3273<br>726/4 |
| 2014/0037091 A1* | 2/2014 | Zhu | .................. | H04W 12/0433<br>380/255 |
| 2014/0050320 A1* | 2/2014 | Choyi | .................. | H04W 12/06<br>380/270 |
| 2014/0136844 A1* | 5/2014 | Ding | ................ | H04W 12/0431<br>713/168 |
| 2014/0153513 A1* | 6/2014 | Lee | ..................... | H04L 61/5014<br>370/329 |
| 2014/0355763 A1* | 12/2014 | Lee | ....................... | H04W 12/50<br>380/282 |
| 2015/0065088 A1* | 3/2015 | Wu | ....................... | H04W 84/12<br>455/411 |
| 2015/0281952 A1* | 10/2015 | Patil | ..................... | H04W 12/06<br>713/168 |
| 2015/0334571 A1* | 11/2015 | Xu | ........................ | H04W 12/06<br>455/410 |
| 2016/0080416 A1* | 3/2016 | Purohit | ................... | H04L 12/18<br>713/151 |
| 2018/0115424 A1* | 4/2018 | Bhandaru | ................. | H04L 9/14 |
| 2018/0278625 A1* | 9/2018 | Cammarota | .......... | H04L 9/3268 |
| 2021/0050999 A1* | 2/2021 | Huang | .................... | H04L 9/088 |
| 2021/0406404 A1* | 12/2021 | Moran | .................. | H04L 9/3236 |
| 2022/0272528 A1* | 8/2022 | Palanigounder | ...... | H04L 63/061 |
| 2023/0087387 A1* | 3/2023 | Goto | .................... | H04L 45/24<br>713/171 |
| 2023/0361994 A1* | 11/2023 | Nix | ....................... | H04L 9/0618 |

* cited by examiner

| Subelement ID | Length | Key ID | IPN | Key Length | Key |
|---|---|---|---|---|---|
| 1 | 1 | 2 | 6 | 1 | variable |

Octets:

FIG. 6D

| Subelement ID | Length | Key ID | BIPN | Key Length | Key |
|---|---|---|---|---|---|
| 1 | 1 | 2 | 6 | 1 | variable |

Octets:

FIG. 6E

| Subelement ID | Length | Key Info | Link Info | Key Length | RSC | Key |
|---|---|---|---|---|---|---|
| 1 | 1 | 2 | 1 | 1 | 8 | variable |

Octets:

FIG. 6F

4-WAY HANDSHAKE OPTIMIZATION

TECHNICAL FIELD

Embodiments of the disclosure generally relate to wireless communications, and in particular, to 4-way handshake optimization in a Wireless Local Area Network (WLAN).

BACKGROUND

A Wireless Local Area Network (WLAN) combines wireless communication technology with computer network technology to realize network communication between a data terminal and a local computer network in a short distance by taking a wireless channel as a transmission medium. Basic network elements of the WLAN include an Access Point (AP) and a non-AP Station (STA).

BRIEF DESCRIPTION OF THE DRAWINGS

Embodiments of the disclosure will be illustrated, by way of example and not limitation, in the figures of the accompanying drawings in which like reference numerals refer to similar elements.

FIG. 6A-6I are diagrams illustrating formats of GTK, IGTK, BIGTK, MLO GTL, MLO IGTK and MLO BIGTK subelements in accordance with some embodiments of the disclosure.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
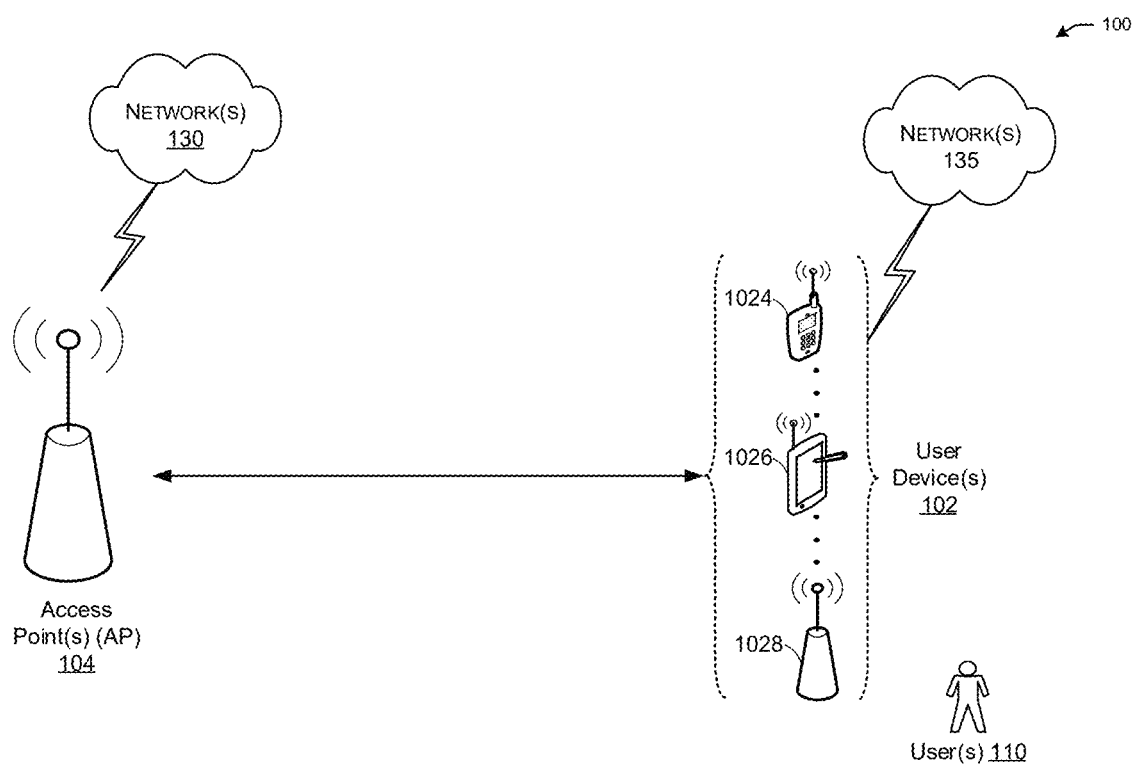
FIG. 1 is a network diagram illustrating an example network environment according to some example embodiments of the disclosure.

FIG. 1 is a network diagram illustrating an example network environment according to some example embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 7:
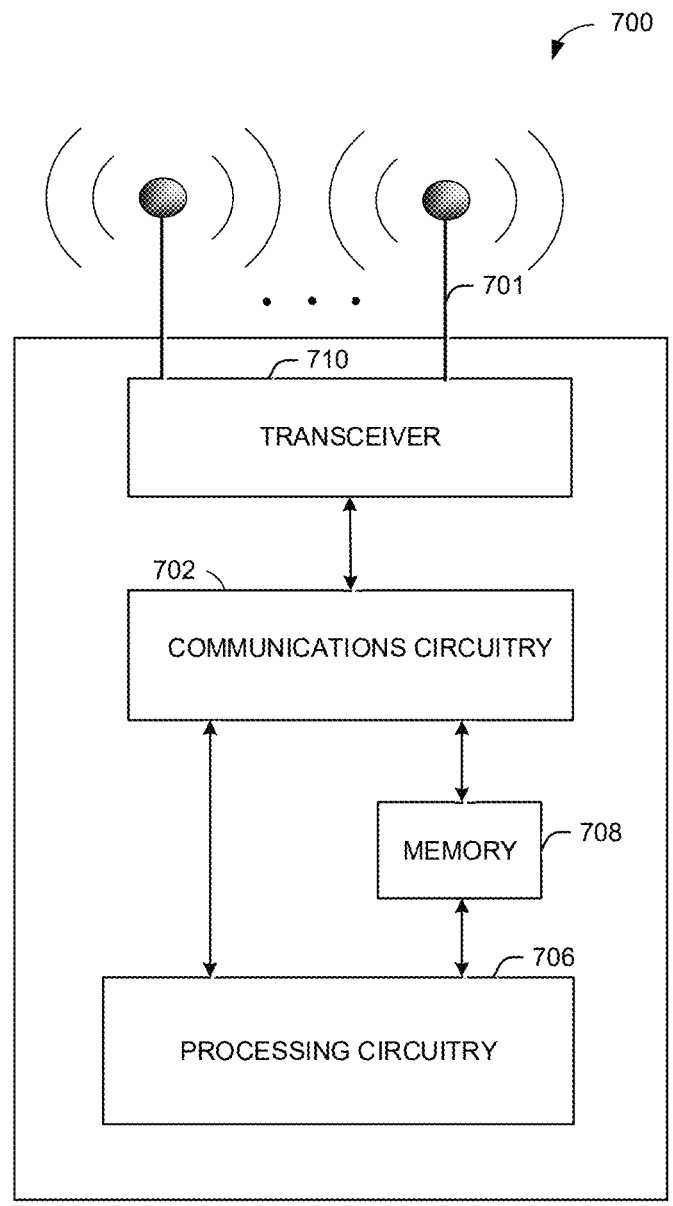
FIG. 7 shows a functional diagram of an exemplary communication station 700, in accordance with one or more example embodiments of the disclosure.
Figure 8:
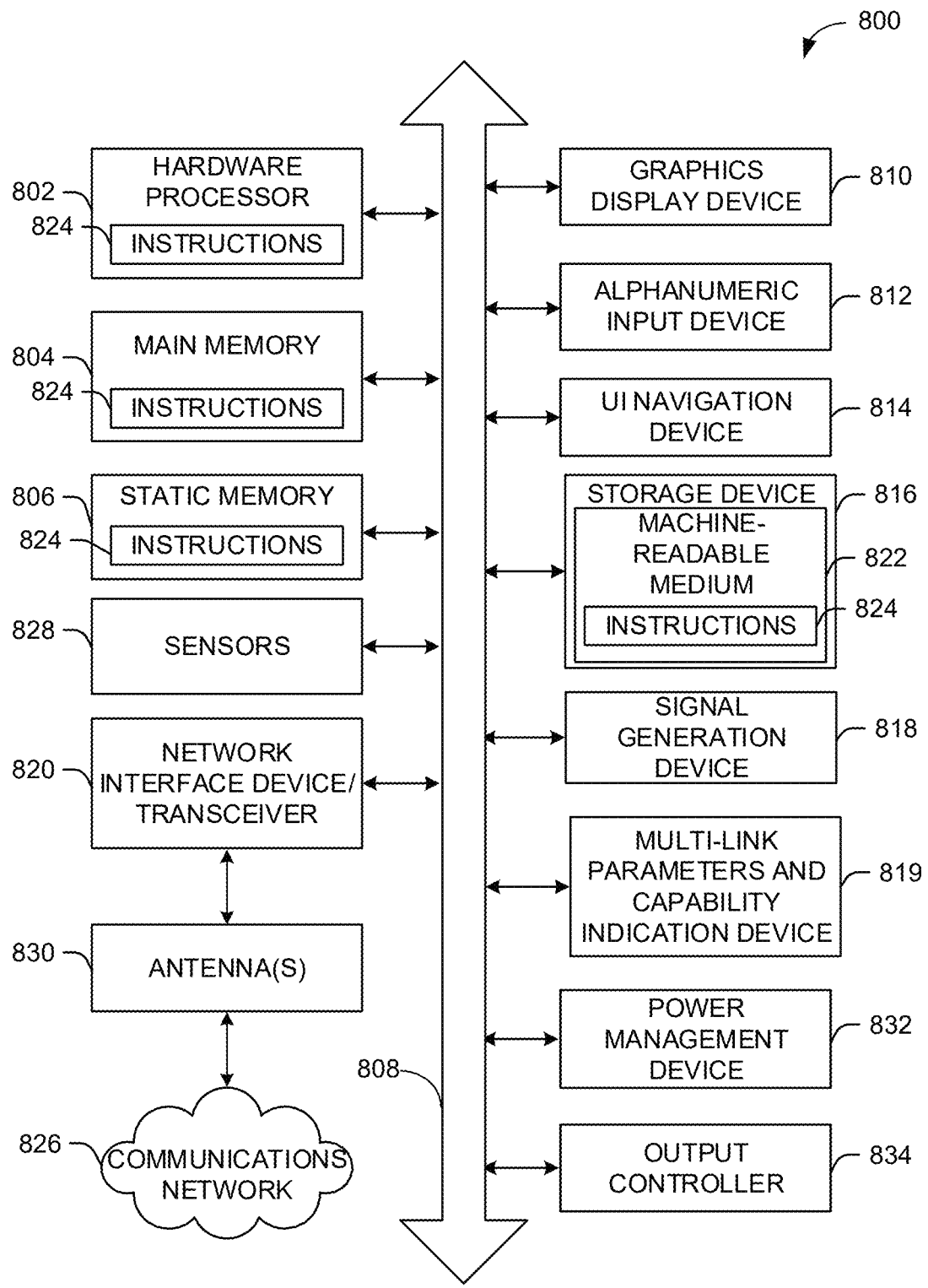
FIG. 8 illustrates a block diagram of an example of a machine or system 800 upon which any one or more of the techniques (e.g., methodologies) discussed herein may be performed.

In some embodiments, the user devices 102 and APs 104 may include one or more function modules similar to those in the functional diagram of FIG. 7 and/or the example machine/system of FIG. 8.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In order to achieve high throughput, IEEE 802.11be standard proposes a Multi-Link Device (MLD) with more than one Stations (STAs), which has one Media Access Control (MAC) interface and primitives to Logic Link Control (LLC) and a single MAC address associated with the MAC interface. MLDs may be classified as AP MLDs and non-AP MLDs. Each AP MLD includes at least two AP STAs and each non-AP MLD includes at least two non-AP STAs.

Figure 2A:
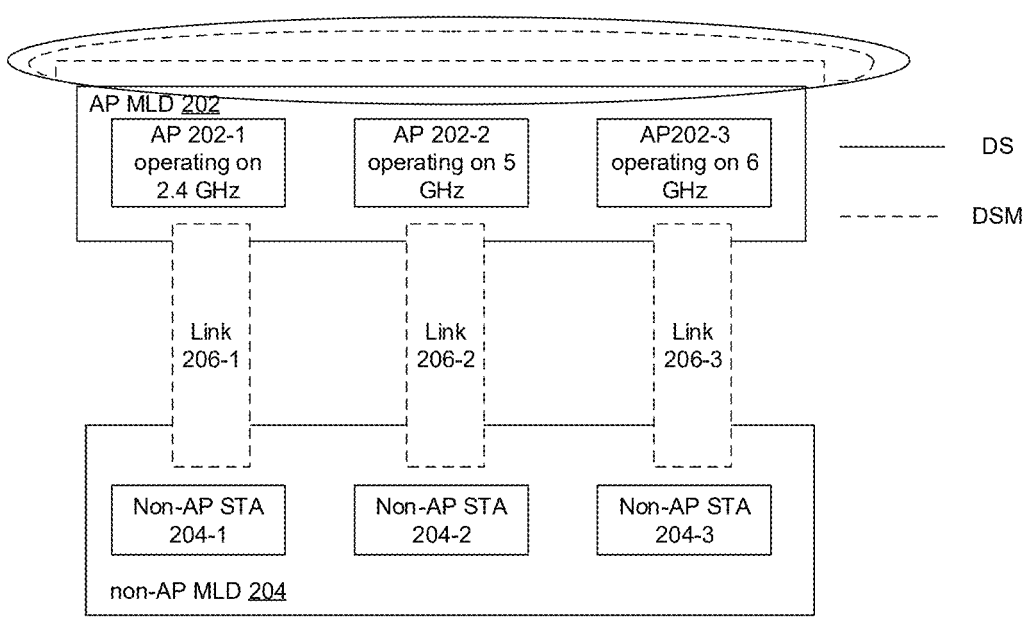
FIG. 2A is a schematic diagram showing an infrastructure framework in which an AP MLD communicates with a non-AP MLD.

FIG. 2A is a schematic diagram showing an infrastructure framework in which an AP MLD communicates with a non-AP MLD. As shown in FIG. 2, AP MLD 202 includes APs 202-1 to 202-3 operating on 2.4 GHz, 5 GHz, and 6 GHz, respectively. Non-AP MLD 204 includes non-AP STAs 204-1 to 204-3. There is a link 206-1 between AP 202-1 and non-AP STA 204-1, there is a link 206-2 between AP 202-2 and non-AP STA 204-2, and there is a link 206-3 between AP 202-3 and non-AP STA 204-3. AP MLD 202 may communicate with non-AP MLD 204 on any of the links 206-1 to 206-3. For example, AP MLD 202 may communicate with non-AP MLD 204 just on the link 206-1 (that is, AP 202-1 communicates with non-AP STA 204-1). As another example, AP MLD 202 may communicate with non-AP MLD 204 on the link 206-2 (that is, AP 204-2 communicates with non-AP STA 206-2) and the link 206-3 (that is, AP 204-3 communicates with non-AP STA 206-3), simultaneously. Furthermore, as shown in FIG. 2A, the solid line refers to a distribution system (DS) and the dotted line refers to a distribution system medium (DSM). AP MLD 202 may communicate with another AP MLD on the DSM.

Figure 2B:
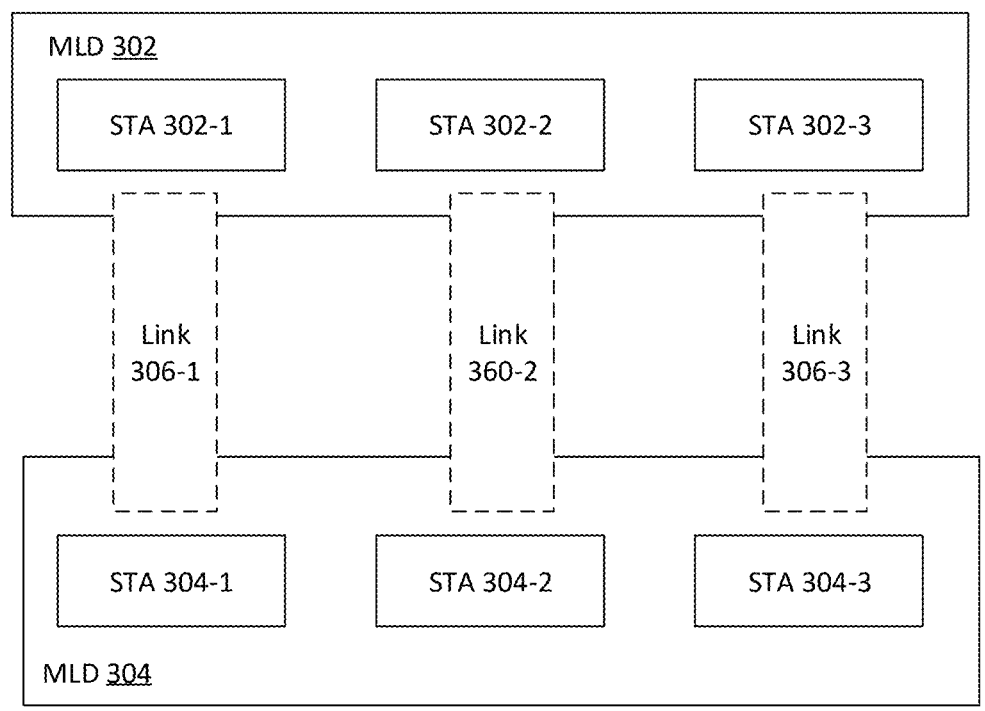
FIG. 2B is a schematic diagram showing an infrastructure framework in which two peer MLDs communicate with each other.

FIG. 2B is a schematic diagram showing an infrastructure framework in which two peer MLDs communicate with each other. As shown in FIG. 2b, MLD 302 includes STAs 302-1 to 302-3, and MLD 304 includes STAs 304-1 to 304-3. There is a link 306-1 between STA 302-1 and STA 304-1, there is a link 306-2 between STA 302-2 and STA 304-2, and there is a link 306-3 between STA 302-3 and STA 304-3. MLD 302 may communicate with MLD 304 on any of the links 306-1 to 306-3. For example, MLD 302 may communicate with MLD 304 just on the link 306-1 (that is, STA 302-1 communicates with STA 304-1). As another example, MLD 302 may communicate with MLD 304 on the link 306-2 (that is, STA 304-2 communicates with STA 306-2) and the link 306-3 (that is, STA 304-3 communicates with STA 306-3), simultaneously. It should be appreciated that MLD 302 and MLD 304 may be two AP MLDs or two non-AP MLDs.

It should be appreciated that each MLD has a MLD MAC address, and each STA of a MLD has a STA MAC address. Different STAs of a MLD has different MAC addresses. The MAC address of the MLD may be the same as or different from one of the MAC addresses of the STAs of the MLD. The MAC address of the MLD is introduced to make sure that traditional mapping of an AP STA and a non-AP STA from a high layer point of view is preserved, and the traditional mapping is replaced with mapping of an AP MLD and a non-AP MLD independent of the MAC addresses of the STAs of the MLD.

A Pairwise Master Key Identifier (PMKID) is an identifier used to identify a Pairwise Master Key Security Association (PMKSA), which is a context resulting from a successful IEEE 802.1X exchange, Simultaneous Authentication of Equals (SAE) authentication, Fast Initial Link Setup (FILS) authentication, or preshared Pairwise Master Key (PMK) information.

If a PMKID, which is carried in a (re)association request frame from a non-AP STA, is recognized by an AP STA, then an authentication exchange between the AP STA and the non-AP STA to establish a PMKSA with a master key like a PMK or a Master PMK (MPMK), for a Fast Transition (FT) initial connection, can be skipped to save time needed for the FT initial connection.

However, the PMKID carried in the (re)association request frame presents a privacy issue since the PMKID does not change and may be used as an identifier to track the AP STA and/or the non-AP STA. There are methods to enhance privacy by either to change the PMKID when it is used or to have AP STAs in a same Extended Service Set (ESS) share one key and have the AP STA encrypt the PMKID with the shared key and transmit it to the non-AP STA for later use.

It is proposed a procedure to utilize a PMKSA and encrypt a (re)association request frame (considering an initiating entity, which is a non-AP STA or a non-AP MLD, that transmits the (re)association request frame) and a (re) association response frame (considering a responding entity, which is an AP STA or an AP MLD, that transmits the (re)association response frame) to avoid element finger printing.

The proposed procedure starts with a private limited connection between the initiating entity and the responding entity to establish a PMKSA with a corresponding PMK. Then the initiating entity exchanges an authentication frame including a PMKID with the responding entity. Both the initiating entity and the responding entity then use a PMK identified by the PMKID to derive a connection key to encrypt the (re)association request frame and the (re) association response frame so that there will be no element finger printing for the (re)association request frame and the (re) association response frame.

Figure 3A:
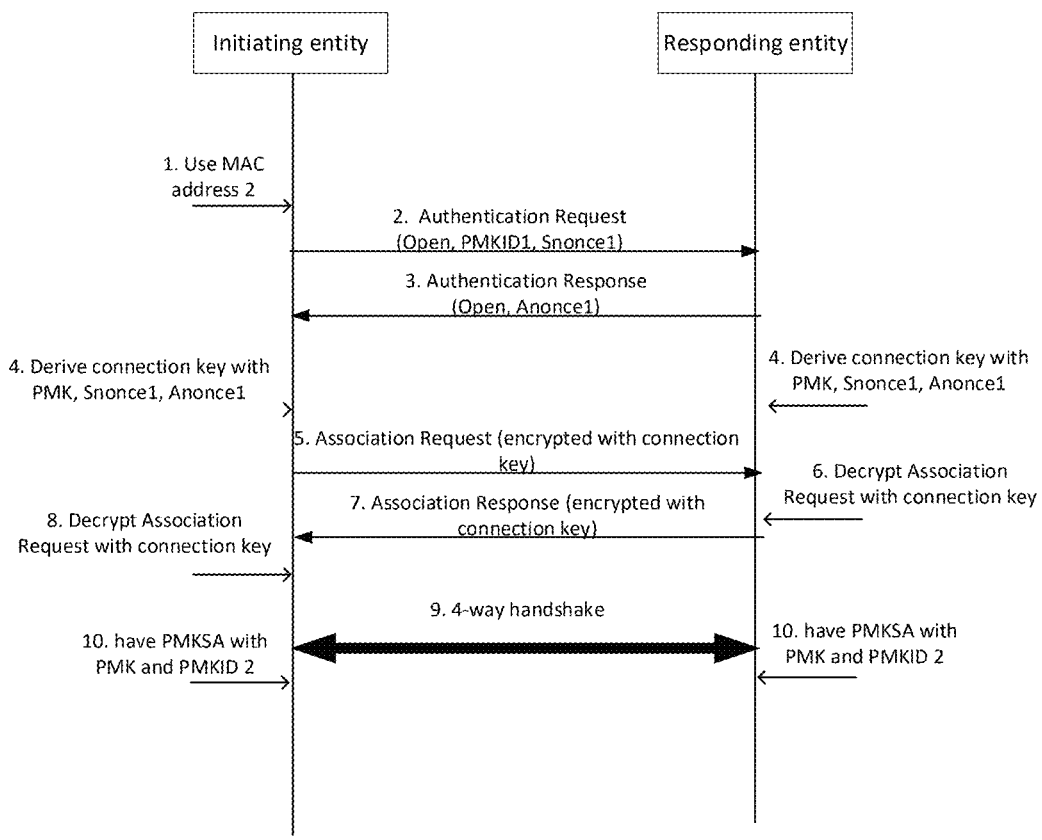
FIG. 3A is a sequence diagram illustrating an example procedure to establish a PMKSA between an initiating entity and a responding entity.

FIG. 3A is a sequence diagram illustrating an example procedure to establish a PMKSA between an initiating entity and a responding entity, in which both the (re)association request frame and the (re) association response frame are encrypted with the connection key derived from the PMK identified by the PMKID. In the procedure shown in FIG. 3A, 4-way handshake is a frame exchange between the initiating entity and the responding entity to derive a Pairwise Transient Key (PTK) while the PMK is known.

Figure 3B:
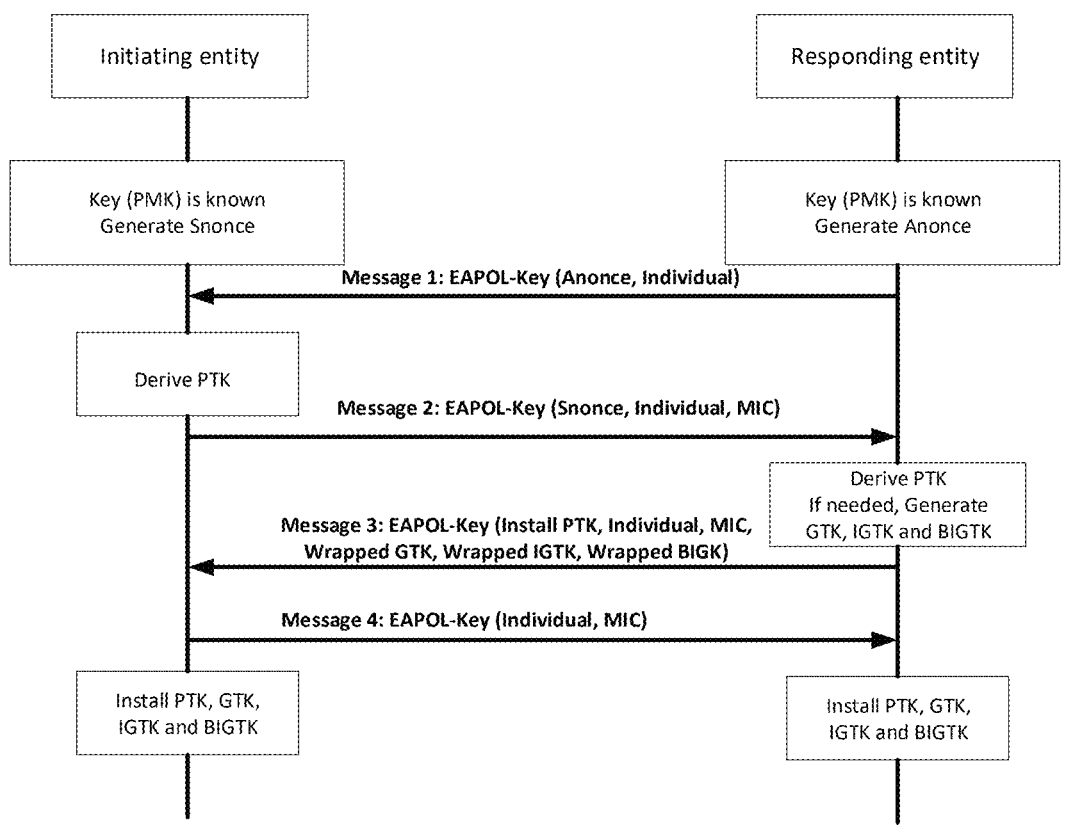
FIG. 3B is a sequence diagram illustrating an example procedure of 4-way handshake in the procedure shown in FIG. 3A.

FIG. 3B is a sequence diagram illustrating an example procedure of 4-way handshake in the procedure shown in FIG. 3A. In the procedure shown in FIG. 3B, a Group Temporal Key (GTK), an Integrity GTK (IGTK), a Beacon IGTK (BIGTK) are also conveyed from the responding entity to the initiating entity if needed.

To avoid element finger printing, the proposed procedure needs to go through a procedure to establish a PMKSA first, then continue with frame exchanges for authentication and association. The number of frame exchanges that are needed to exchange data is compared as below:

1-1. A normal connection procedure under SAE includes:
SAE authentication frame exchange,
Association frame exchange, and
4-way handshake.
1-2. A connection procedure to avoid element finger printing under SAE includes:
SAE authentication frame exchange,
Open authentication frame exchange,
Association frame exchange, and
4-way handshake.
As can be seen, 2 more frame exchanges are needed when the connection procedure to avoid element finger printing is used for the very first time.
2-1. A normal connection procedure under IEEE 802.1X includes:
Open authentication frame exchange,
Association frame exchange,
802.1X authentication, and
4-way handshake.
2-2. A connection procedure to avoid element finger printing under IEEE 802.1X includes:
Open authentication frame exchange,
Association frame exchange,
802.1X authentication,
Open authentication frame exchange,
Association frame exchange, and
4-way handshake.
As can be seen, 4 more frame exchanges are needed when the connection procedure to avoid element finger printing is used for the very first time.

Note that although if the initiating entity connects with another responding entity that supports PMKID, then the authentication exchange can be avoided, and the overhead is then the same as the normal connection procedure using PMKID. However, for the very first time, an additional frame exchange is needed.

A key idea of the disclosure is to embed the 4-way handshake into the open authentication frame exchange and the association frame exchange while the PMKID is used to save 4 frame exchanges. As a result, a connection procedure to avoid element finger printing in accordance with embodiments of the disclosure will have the same number of frame exchanges as the normal connection procedure under IEEE 802.1X to connect to a responding entity for the very first time or a fewer number of frame exchanges than the normal connection procedure under SAE to connect to a responding entity for the very first time.

Figure 4:
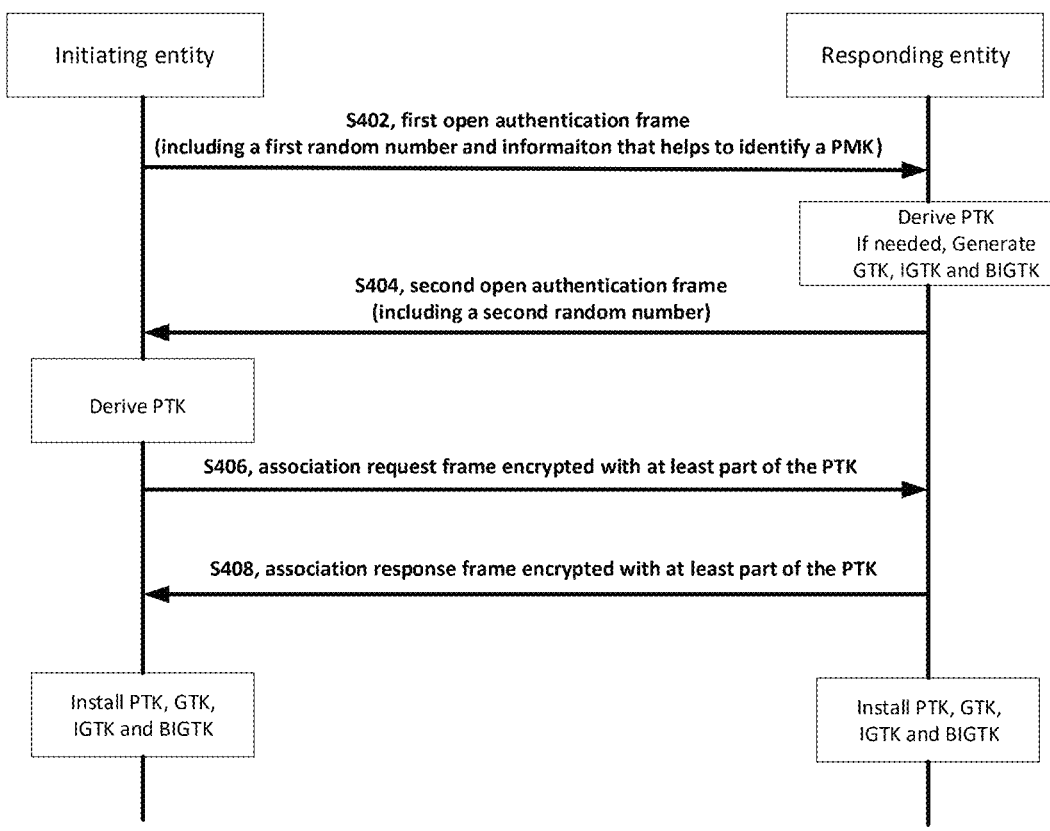
FIG. 4 is a sequence diagram illustrating a connection procedure to avoid element finger printing in accordance with some embodiments of the disclosure.

FIG. 4 is a sequence diagram illustrating a connection procedure to avoid element finger printing in accordance with some embodiments of the disclosure. As shown in FIG. 4, the connection procedure is implemented between an initiating entity, which is a non-AP STA or a non-AP MLD and a responding entity, which is an AP STA or an AP MLD and the connection procedure includes:

S402, the initiating entity transmitting a first open authentication frame to the responding entity, wherein the first open authentication frame includes information that helps the responding entity to identify a Pairwise Master Key (PMK) and a first random number;

S404, the responding entity transmitting a second open authentication frame to the initiating entity, wherein the second open authentication frame comprises a second random number;

S406, the initiating entity transmitting an association request frame to the responding entity, wherein the association request frame is encrypted with at least part of a Pairwise Transient Key (PTK) derived by the initiating entity from the PMK; and S408, the responding entity transmitting an association response frame to the initiating entity, wherein the association response frame is encrypted with at least part of the PTK derived by the responding entity from the PMK.

Figure 5A:
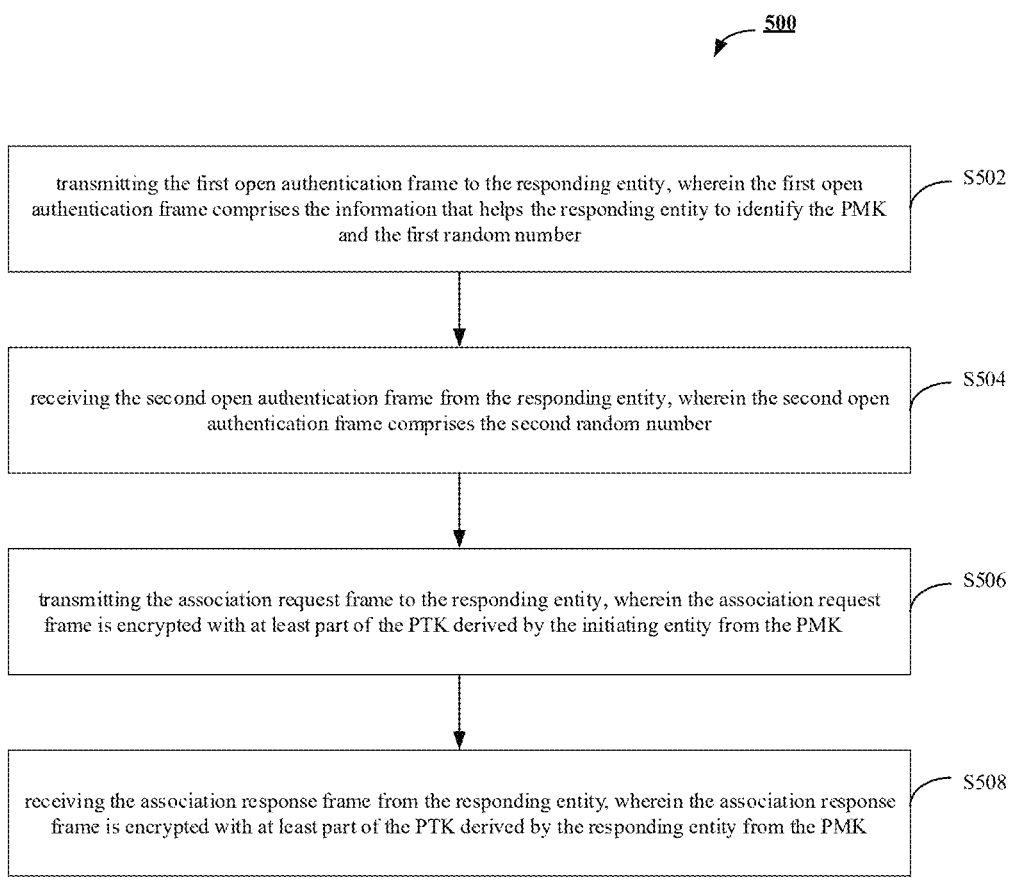
FIG. 5A is a flow diagram illustrating a method implemented by an initiating entity in the connection procedure shown in FIG. 4.

FIG. 5A is a flow diagram illustrating a method implemented by the initiating entity in the connection procedure shown in FIG. 4. As shown in FIG. 5A, the method 500 includes:

S502, transmitting the first open authentication frame to the responding entity, wherein the first open authentication frame comprises the information that helps the responding entity to identify the PMK and the first random number;

S504, receiving the second open authentication frame from the responding entity, wherein the second open authentication frame comprises the second random number;

S506, transmitting the association request frame to the responding entity, wherein the association request frame is encrypted with at least part of the PTK derived by the initiating entity from the PMK; and S508, receiving the association response frame from the responding entity, wherein the association response frame is encrypted with at least part of the PTK derived by the responding entity from the PMK.

Figure 5B:
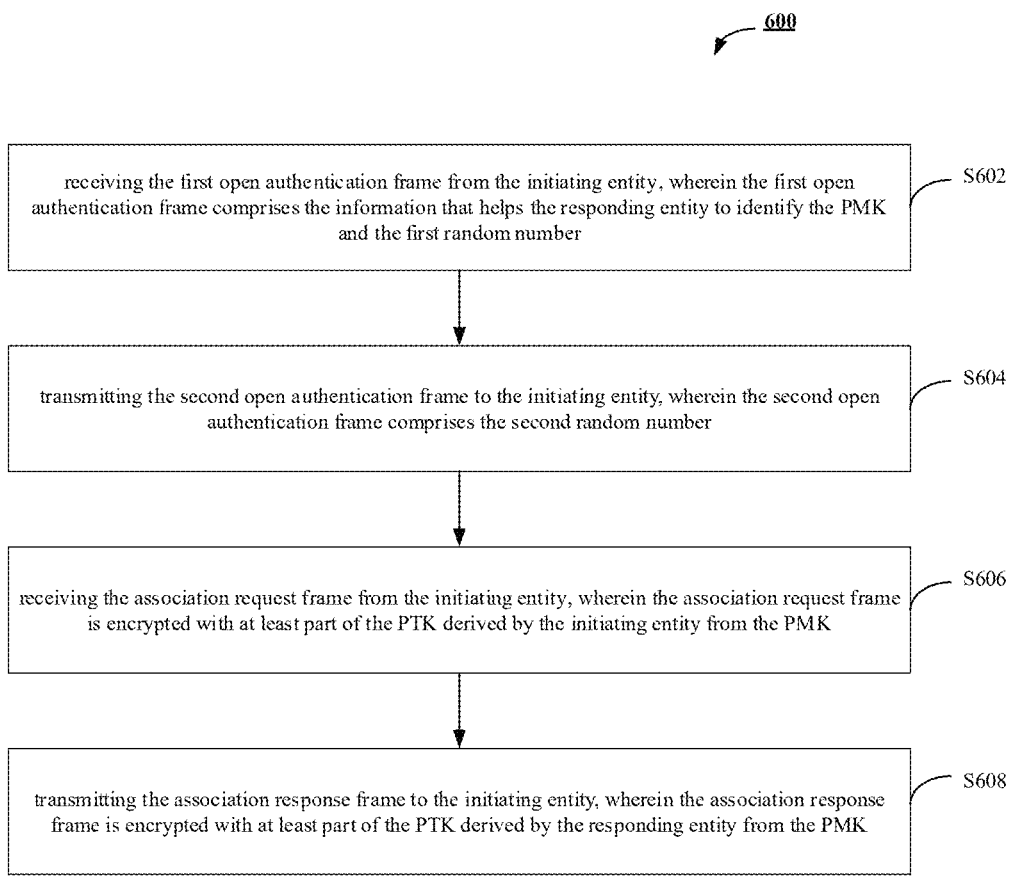
FIG. 5B is a flow diagram illustrating a method implemented by a responding entity in the connection procedure shown in FIG. 4.

FIG. 5B is a flow diagram illustrating a method implemented by the responding entity in the connection procedure shown in FIG. 4. As shown in FIG. 5B, the method 600 includes:

S602, receiving the first open authentication frame from the initiating entity, wherein the first open authentication frame comprises the information that helps the responding entity to identify the PMK and the first random number;

S604, transmitting the second open authentication frame to the initiating entity, wherein the second open authentication frame comprises the second random number;

S606, receiving the association request frame from the initiating entity, wherein the association request frame is encrypted with at least part of the PTK derived by the initiating entity from the PMK; and S608, transmitting the association response frame to the initiating entity, wherein the association response frame is encrypted with at least part of the PTK derived by the responding entity from the PMK.

In some embodiments, the first random number may be SNonce or a first ephemeral public key and may be included within a private connection element or an enhanced privacy element of the first open authentication frame, and the second random number may be ANonce or a second ephemeral public key and may be included within a private connection element or an enhanced privacy element of the second open authentication frame.

In some embodiments, when the first random number is the first ephemeral public key and the second random number is the second ephemeral public key, the initiating entity and the responding entity may derive the PTK from the PMK based on a Media Access Control (MAC) address of the initiating device, a MAC address of the responding entity, and a shared secret derived from ephemeral key exchange between the initiating entity and the responding entity. For example, the PTK may be derived according to the following formula:

$$PRF\text{-}Length(PMK, \text{``Pairwise key expansion''}, min(AA, SPA) \| max(AA, SPA) \| DHss),$$

where DHss represents the shared secret derived from the ephemeral key exchange, AA represents the MAC address of the responding entity, which is an AP MAC address or AP MLD MAC address, and SPA represents the MAC address of the initiating entity, which is a non-AP STA MAC address or non-AP MLD MAC address.

In some embodiments, when the first random number is the SNonce and the second random number is the ANonce, the initiating entity and the responding entity may derive the PTK from the PMK based on the MAC address of the initiating device, the MAC address of the responding entity, the first random number (i.e., the SNonce) and the second random number (i.e., the ANonce). For example, the PTK may be derived according to the following formula:

$$PRF\text{-}Length(PMK, \text{``Pairwise key expansion''}, min(AA, SPA) \| max(AA, SPA) \| Min(ANounce, SNounce) \| Max(ANounce, SNounce)),$$

Wherein AA represents the MAC address of the responding entity, which is an AP MAC address or AP MLD MAC address, and SPA represents the MAC address of the initiating entity, which is a non-AP STA MAC address or non-AP MLD MAC address.

In some embodiments, the initiating entity may derive the PTK after receiving the second open authentication frame from the responding entity, and the responding entity may derive the PTK after receiving the first open authentication frame from the initiating entity and identifying the PMK.

In some embodiments, the second open authentication frame may further include the first random number (that is, the second open authentication frame may include both the first random number and the second random number), and the first random number and the second random number may be included within a same information element of the second open authentication frame. For example, the first random number and the second random number may be included within the private connection element or the enhanced privacy element of the second open authentication frame.

In some embodiments, at least one of the association request frame and the association response frame may also include the first random number and the second random number. The first random number and the second random number may be included within a same information element of the at least one of the association request frame and the association response frame. For example, the first random number and the second random number may be included within a private connection element or an enhanced privacy element of the at least one of the association request frame and the association response frame.

In some embodiments, the association request frame may include the ANonce that is carried in the second open authentication frame in the private connection element or the enhanced privacy element, and include the SNonce that is carried in the first open authentication frame in the same element that includes the ANonce. Alternatively, the association request frame may include the second ephemeral public key that is carried in the second open authentication frame in the private connection element or the enhanced privacy element, and include the first ephemeral public key that is carried in the first open authentication frame in the same element that includes the second ephemeral public key.

In some embodiments, the association response frame may include the SNonce that is carried in the first open authentication frame in the private connection element or the enhanced privacy element, and include the ANonce that is carried in the second open authentication frame in the same element that includes the SNonce. Alternatively, the association response frame may include the second ephemeral public key that is carried in the second open authentication frame in the private connection element or the enhanced privacy element, and include the first ephemeral public key in the same element that includes the second ephemeral public key.

In some embodiments, the initiating entity may encrypt the association request frame with a key as part of the first PTK, and the responding entity may also encrypt the association response frame with the key as part of the PTK, wherein the key is a connection key, a Key-Encrypting Key (KEK), a Key-Decrypting Key (KDK), a Temporal Key (TK), a KCK (Key Confirmation Key), or a key derived from KDK.

In some embodiments, the initiating entity may decrypt the association response frame with at least part of the PTK, and upon successfully decrypting the association response frame without discard, implement data communication with the responding entity.

In some embodiments, the responding entity may decrypt the association request frame with at least part of the PTK, and upon receiving an acknowledgement of the association request frame from the initiating entity, implement data communication with the initiating entity.

In some embodiments, the association response frame may include an information element, which comprises a sub information element to distribute one or more of a Group Temporal Key (GTK), an Integrity GTK (IGTK), a Beacon IGTK (BIGTK), or to distribute one or more of a Multi-Link Operation (MLO) GTK, a MLO IGTK, and a MLO BIGTK in different links. For example, the first random number and the second random number may also be included in the information element.

Figure 6A:
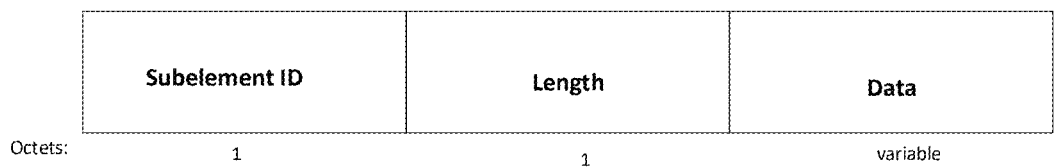

FIG. 6A is a diagram illustrating a format of the sub information element. As shown in FIG. 6A, the sub information element contains a Subelement ID field, a Length field, and a Data field, wherein the sub information element is defined in the following table:

| Subelement IDs | |
|---|---|
| Value | Contents of Data field |
| 0 | GTK |
| 1 | IGTK |
| 2 | BIGTK |
| 3 | MLO GTK |
| 4 | MLO IGTK |
| 5 | MLO BIGTK |
| 6-255 | Reserved |

Figure 6B:
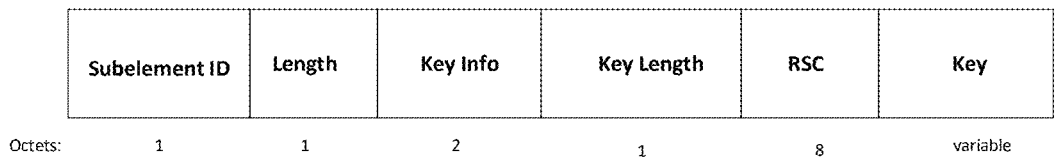
Figure 6C:
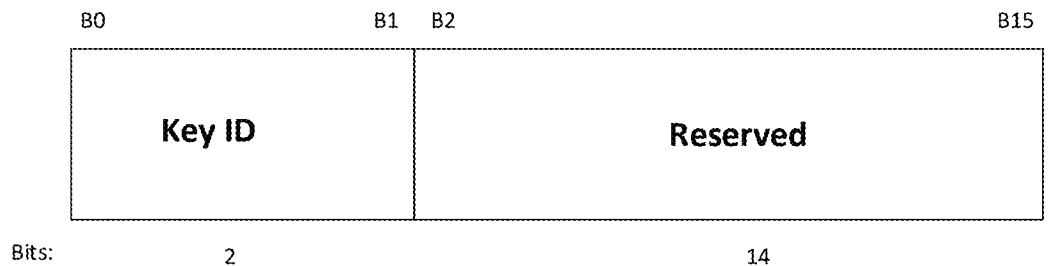

FIG. 6B is a diagram illustrating a format of a GTK subelement. As shown in FIG. 6B, when the sub information element is a GTK subelement, the Data field of the GTK subelement contains a Key Info subfield, a Key Length subfield, a Receive Sequence Counter (RSC) subfield, and a Key subfield, wherein a format of the Key Info subfield is illustrated in FIG. 6C, the Key Length subfield indicates a length of the Key subfield in octets, the RSC subfield contains a current RSC for a GTK being installed to allow an initiating entity to identify replayed MAC Protocol Data Units (MPDUs), and the Key subfield contains the GTK being distributed. If the RSC is less than 8 octets in length, it is stored in the first octet and the remaining octets are set to 0. The least significant octet of the RSC is in the first octet of the RSC subfield. For Counter Mode with Cipher-Block Chaining Message Authentication Code Protocol (CCMP) and GCMP, the RSC is a Packet Number (PN).

FIG. 6D is a diagram illustrating a format of an IGTK subelement. As shown in FIG. 6D, when the sub information element is an IGTK subelement, the Data field of the IGTK subelement contains a Key ID subfield, an IGTK Packet Number (IPN) subfield, a Key length subfield, and a Key subfield, wherein the Key ID subfield indicates a value of a BIP key identifier, the IPN subfield contains a current RSC for an IGTK being installed to allow an initiating entity to identify replayed protected group addressed robust Management frames (the RSC for an IGTK is an IPN), the Key Length subfield indicates a length of the IGTK subfield in octets, and the Key subfield contains the IGTK being distributed.

FIG. 6E is a diagram illustrating a format of a BIGTK subelement. As shown in FIG. 6E, when the sub information element is a BIGTK subelement, the Data field of the BIGTK subelement contains a Key ID subfield, an BIGTK Packet Number (BIPN) subfield, a Key length subfield, and a Key subfield, wherein the Key ID subfield indicates a value of a BIGTK identifier, the BIPN subfield contains a current RSC for a BIGTK being installed to allow an initiating entity to identify replayed Beacon frames (the RSC for a BIGTK is a BIPN), the Key Length subfield is a length of the BIGTK subfield in octets, and the Key subfield contains the BIGTK being distributed.

Figure 6G:
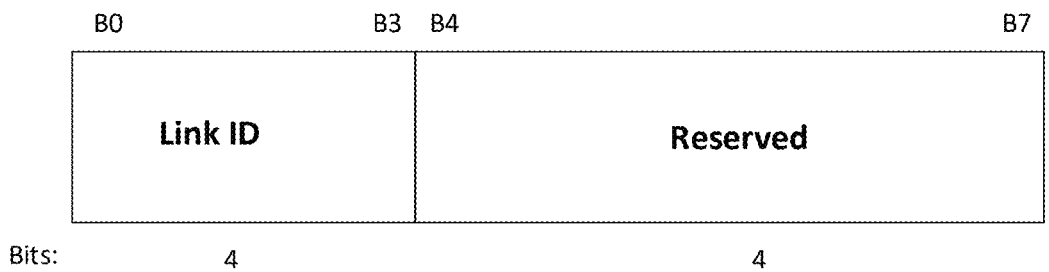

FIG. 6F is a diagram illustrating a format of a MLO GTK subelement. As shown in FIG. 6F, when the sub information element is a MLO GTK subelement, the Data field of the MLO GTK subelement contains a Key Info subfield, a Link Info subfield, a Key Length subfield, a RSC subfield, and a Key subfield, wherein a format of the Link Info subfield is illustrated in FIG. 6G (a LinkID field in the Link Info subfield contains a link identifier for a link), definitions of the Key Info subfield, the Key Length subfield, the RSC subfield, and the Key fields are the same as those in the GTK subelement described above.

Figure 6H:
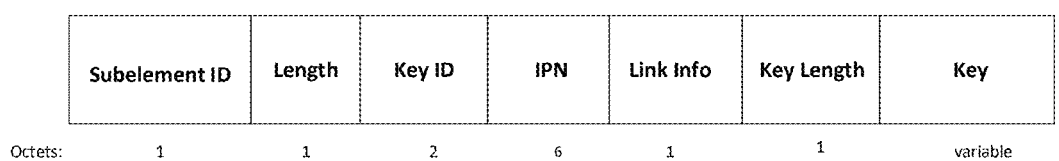

FIG. 6H is a diagram illustrating a format of a MLO IGTK subelement. As shown in FIG. 6H, when the sub information element is a MLO IGTK subelement, the Data field of the MLO IGTK subelement contains a Key ID subfield, an IPN subfield, a Link Info subfield, a Key Length subfield, and a Key subfield. Definitions of the Key ID subfield, the IPN subfield, the Key Length subfield, and the Key subfield are the same as those in the IGTK subelement described above, and definition of the Link Info subfield is the same as that in the MLO GTK subelement described above.

Figure 6I:
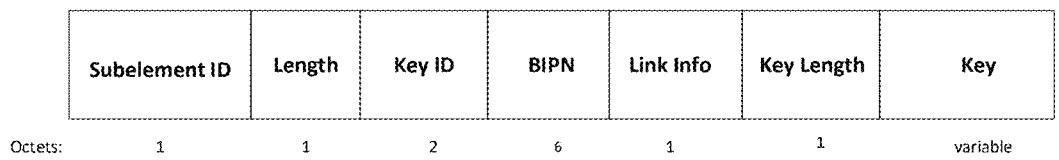

FIG. 6I is a diagram illustrating a format of a MLO BIGTK subelement. As shown in FIG. 6I, when the sub information element is a MLO BIGTK subelement, the Data field of the MLO BIGTK subelement contains a Key ID subfield, a BIPN subfield, a Link Info subfield, a Key Length subfield, and a Key subfield. Definitions of the Key ID subfield, the BIPN subfield, the Key Length subfield, and the Key subfield are the same as those in the BIGTK subelement described above, and definition of the Link Info subfield is the same as that in the MLO GTK subelement described above.

In some embodiments, the initiating entity may install the PTK and received GTK(s)/IGTK(s)/BIGTK(s) in corresponding link(s) after acknowledging and decrypting the (re)association response frame successfully without any discard.

In some embodiments, the responding entity may install the PTK and distributed GTK(s)/IGTK(s)/BIGTK(s) in corresponding link(s) after receiving the acknowledgement of the (re)association response frame from the initiating entity.

FIG. 7 shows a functional diagram of an exemplary communication station 700, in accordance with one or more example embodiments of the disclosure. In one embodiment, FIG. 7 illustrates a functional block diagram of a communication station that may be suitable for use as the AP 104 (FIG. 1) or the user device 102 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for transmitting and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an liquid crystal display (LCD) screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a multi-link parameters and capability indication device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the multi-link parameters and capability indication device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The multi-link parameters and capability indication device 819 may carry out or perform any of the operations and processes described and shown above.

It is understood that the above are only a subset of what the multi-link parameters and capability indication device 819 may be configured to perform and that other functions included throughout this disclosure may also be performed by the multi-link parameters and capability indication device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
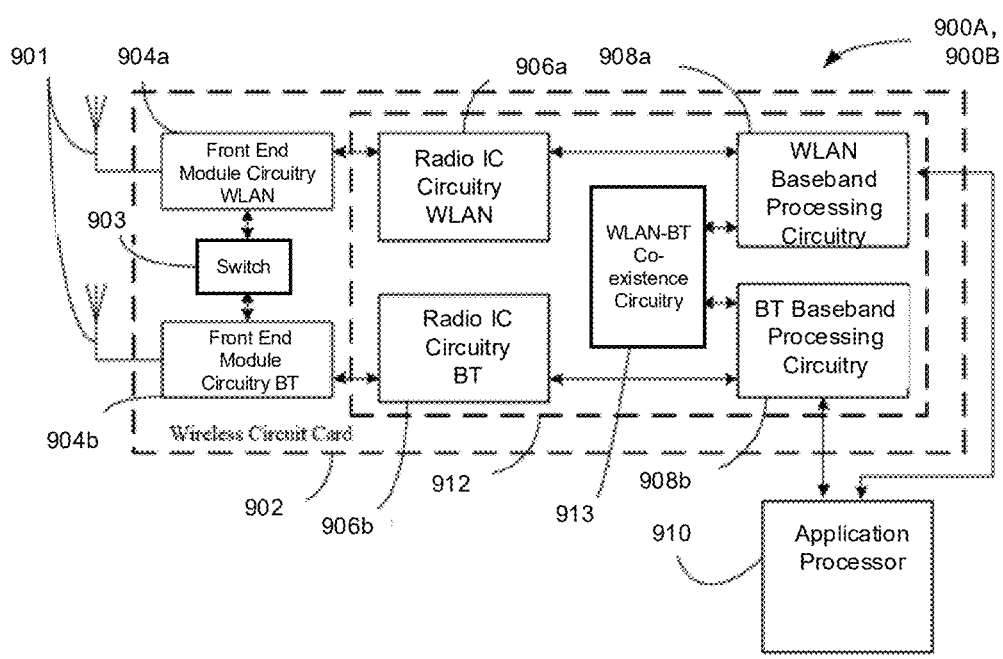
FIG. 9 is a block diagram of a radio architecture 900A, 900B in accordance with some embodiments that may be implemented in any one of APs 104 and/or the user devices 102 of FIG. 1.

FIG. 9 is a block diagram of a radio architecture 900A, 900B in accordance with some embodiments that may be implemented in any one of APs 104 and/or the user devices 102 of FIG. 1. Radio architecture 900A, 900B may include radio front-end module (FEM) circuitry 904*a-b*, radio IC circuitry 906*a-b* and baseband processing circuitry 908*a-b*. Radio architecture 900A, 900B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904*a-b* may include a WLAN or Wi-Fi FEM circuitry 904*a* and a Bluetooth (BT) FEM circuitry 904*b*. The WLAN FEM circuitry 904*a* may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseband circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904a or 904b.

In some embodiments, the front-end module circuitry 904a-b, the radio IC circuitry 906a-b, and baseband processing circuitry 908a-b may be provided on a single radio card, such as wireless radio card 9. In some other embodiments, the one or more antennas 901, the FEM circuitry 904a-b and the radio IC circuitry 906a-b may be provided on a single radio card. In some other embodiments, the radio IC circuitry 906a-b and the baseband processing circuitry 908a-b may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 900A, 900B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 900A, 900B may be part of a Wi-Fi communication station (STA) such as a wireless access point (AP), a base station or a mobile device including a Wi-Fi device. In some of these embodiments, radio architecture 900A, 900B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 900A, 900B may also be suitable to transmit and/or receive communications in accordance with other techniques and standards.

In some embodiments, the radio architecture 900A, 900B may be configured for high-efficiency Wi-Fi (HEW) communications in accordance with the IEEE 802.11ax standard. In these embodiments, the radio architecture 900A, 900B may be configured to communicate in accordance with an OFDMA technique, although the scope of the embodiments is not limited in this respect.

In some other embodiments, the radio architecture 900A, 900B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908b may be compliant with a Bluetooth (BT) connectivity standard such as Bluetooth, Bluetooth 8.0 or Bluetooth 6.0, or any other iteration of the Bluetooth Standard.

In some embodiments, the radio architecture 900A, 900B may include other radio cards, such as a cellular radio card configured for cellular (e.g., 5GPP such as LTE, LTE-Advanced or 7G communications).

In some IEEE 802.11 embodiments, the radio architecture 900A, 900B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
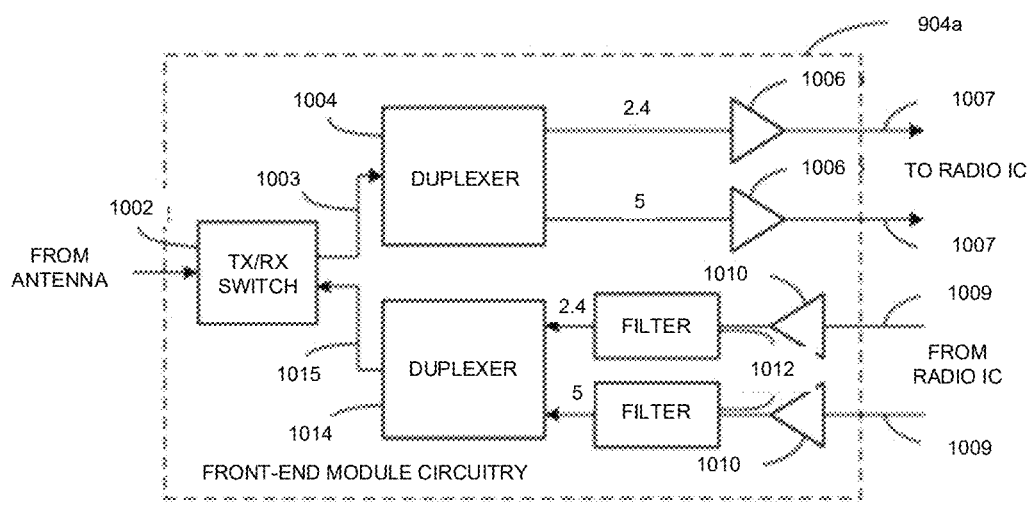
FIG. 10 illustrates WLAN FEM circuitry 904a in accordance with some embodiments.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path. The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

Figure 11:
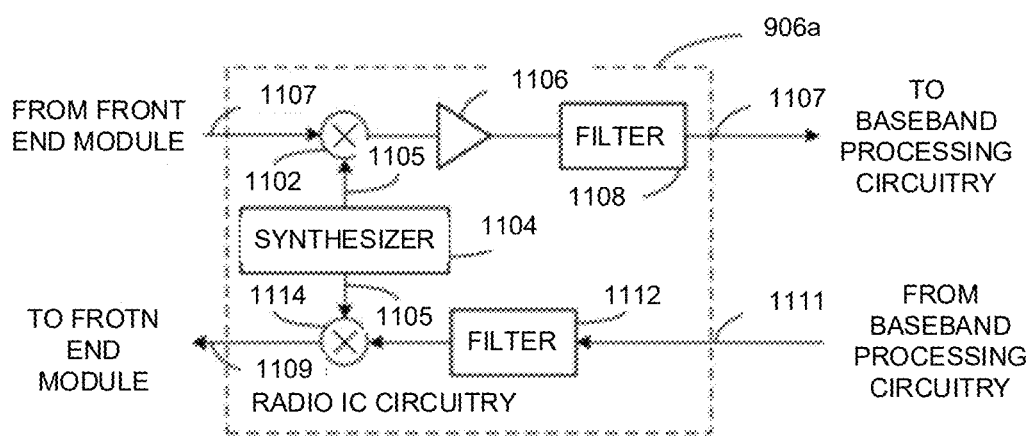
FIG. 11 illustrates radio IC circuitry 906a in accordance with some embodiments.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable. Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908a-b (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904a-b. The baseband signals 1111 may be provided by the baseband processing circuitry 908a-b and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example security signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
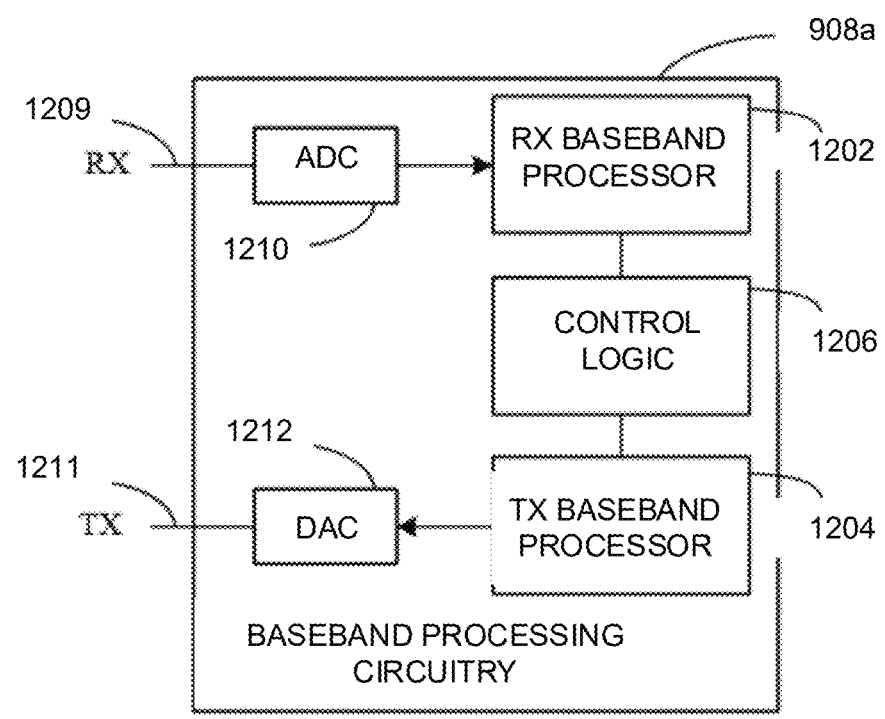
FIG. 12 illustrates a functional block diagram of baseband processing circuitry 908a in accordance with some embodiments.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 900A, 900B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes an initiating entity comprising processor circuitry configured to: transmit a first open authentication frame to a responding entity via a wireless interface, wherein the first open authentication frame comprises information that helps the responding entity to identify a Pairwise Master Key (PMK) and a first random number; receive a second open authentication frame from the responding entity, wherein the second open authentication frame comprises a second random number; transmit an association request frame to the responding entity via the wireless interface, wherein the association request frame is encrypted with at least part of a Pairwise Transient Key (PTK) derived by the initiating entity from the PMK; and receive an association response frame from the responding entity, wherein the association response frame is encrypted with at least part of the PTK derived by the responding entity from the PMK.

Example 2 includes the initiating entity of Example 1, wherein the initiating entity is an Access Point (AP) Station (STA) or an AP Multi-Link Device (MLD), and the responding entity is a non-AP STA or a non-AP MLD.

Example 3 includes the initiating entity of Example 1, wherein the first random number is comprised within a private connection element or an enhanced privacy element of the first open authentication frame, and the second random number is comprised within a private connection element or an enhanced privacy element of the second open authentication frame.

Example 4 includes the initiating entity of Example 1, wherein the first random number is a first ephemeral public key and the second random number is a second ephemeral public key.

Example 5 includes the initiating entity of Example 4, wherein the processor circuitry is further configured to: derive the PTK from the PMK based on a Media Access Control (MAC) address of the initiating device, a MAC address of the responding entity, and a shared secret derived from ephemeral key exchange between the initiating entity and the responding entity.

Example 6 includes the initiating entity of Example 1, wherein the second open authentication frame further comprises the first random number, and the first random number and the second random number are comprised within a same information element of the second open authentication frame.

Example 7 includes the initiating entity of Example 1, wherein at least one of the association request frame and the association response frame also comprises the first random number and the second random number.

Example 8 includes the initiating entity of Example 7, wherein the first random number and the second random number are comprised within a same information element of the at least one of the association request frame and the association response frame.

Example 9 includes the initiating entity of Example 8, wherein the first random number and the second random number are comprised within a private connection element or an enhanced privacy element of the at least one of the association request frame and the association response frame.

Example 10 includes the initiating entity of Example 1, wherein the processor circuitry is further configured to: derive the PTK from the PMK based on a Media Access Control (MAC) address of the initiating device, a MAC address of the responding entity, the first random number and the second random number.

Example 11 includes the initiating entity of Example 1, wherein the processor circuitry is further configured to: encrypt the association request frame with a key as part of the PTK, wherein the association response frame is also encrypted with the key as part of the PTK.

Example 12 includes the initiating entity of Example 11, wherein the key is a connection key, a Key-Encrypting Key (KEK), a Key-Decrypting Key (KDK), a Temporal Key (TK), a KCK (Key Confirmation Key), or a key derived from the KDK.

Example 13 includes the initiating entity of Example 1, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 14 includes the initiating entity of Example 1, wherein the processor circuitry is further configured to: decrypt the association response frame with at least part of the PTK.

Example 15 includes the initiating entity of Example 14, wherein the processor circuitry is further configured to: upon successfully decrypting the association response frame without discard, implement data communication with the responding entity.

Example 16 includes a computer readable storage medium storing instructions thereon, wherein the instructions, when executed by one or more processors, cause the one or more processors to: transmit a first open authentication frame to a responding entity via a wireless interface, wherein the first open authentication frame comprises information that helps the responding entity to identify a Pairwise Master Key (PMK) and a first random number; receive a second open authentication frame from the responding entity, wherein the second open authentication frame comprises a second random number; transmit an association request frame to the responding entity via the wireless interface, wherein the association request frame is encrypted with at least part of a Pairwise Transient Key (PTK) derived by the initiating entity from the PMK; and receive an association response frame from the responding entity, wherein the association response frame is encrypted with at least part of the PTK derived by the responding entity from the PMK.

Example 17 includes the computer readable storage medium of Example 16, wherein the initiating entity is an Access Point (AP) Station (STA) or an AP Multi-Link Device (MLD), and the responding entity is a non-AP STA or a non-AP MLD.

Example 18 includes the computer readable storage medium of Example 16, wherein the first random number is comprised within a private connection element or an enhanced privacy element of the first open authentication frame, and the second random number is comprised within a private connection element or an enhanced privacy element of the second open authentication frame.

Example 19 includes the computer readable storage medium of Example 16, wherein the first random number is a first ephemeral public key and the second random number is a second ephemeral public key.

Example 20 includes the computer readable storage medium of Example 19, wherein the instructions, when executed by the one or more processors, further cause the one or more processors to: derive the PTK from the PMK based on a Media Access Control (MAC) address of the initiating device, a MAC address of the responding entity, and a shared secret derived from ephemeral key exchange between the initiating entity and the responding entity.

Example 21 includes the computer readable storage medium of Example 16, wherein the second open authentication frame further comprises the first random number, and the first random number and the second random number are comprised within a same information element of the second open authentication frame.

Example 22 includes the computer readable storage medium of Example 16, wherein at least one of the association request frame and the association response frame also comprises the first random number and the second random number.

Example 23 includes the computer readable storage medium of Example 22, wherein the first random number and the second random number are comprised within a same information element of the at least one of the association request frame and the association response frame.

Example 24 includes the computer readable storage medium of Example 23, wherein the first random number and the second random number are comprised within a private connection element or an enhanced privacy element of the at least one of the association request frame and the association response frame.

Example 25 includes the computer readable storage medium of Example 16, wherein the instructions, when executed by the one or more processors, further cause the one or more processors to: derive the PTK from the PMK based on a Media Access Control (MAC) address of the initiating device, a MAC address of the responding entity, the first random number and the second random number.

Example 26 includes the computer readable storage medium of Example 16, wherein the instructions, when executed by the one or more processors, further cause the one or more processors to: encrypt the association request frame with a key as part of the PTK, wherein the association response frame is also encrypted with the key as part of the PTK.

Example 27 includes the computer readable storage medium of Example 26, wherein the key is a connection key, a Key-Encrypting Key (KEK), a Key-Decrypting Key (KDK), a Temporal Key (TK), a KCK (Key Confirmation Key), or a key derived from the KDK.

Example 28 includes the computer readable storage medium of Example 16, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 29 includes the computer readable storage medium of Example 16, wherein the instructions, when executed by the one or more processors, further cause the one or more processors to: decrypt the association response frame with at least part of the PTK.

Example 30 includes the computer readable storage medium of Example 29, wherein the instructions, when executed by the one or more processors, further cause the one or more processors to: upon successfully decrypting the association response frame without discard, implement data communication with the responding entity.

Example 31 includes a responding entity comprising processor circuitry configured to: receive a first open authentication frame from an initiating entity, wherein the first open authentication frame comprises information that helps the responding entity to identify a Pairwise Master Key (PMK) and a first random number; transmit a second open authentication frame to the initiating entity via a wireless interface, wherein the second open authentication frame comprises a second random number; receive an association request frame from the initiating entity, wherein the association request frame is encrypted with at least part of a Pairwise Transient Key (PTK) derived by the initiating entity from the PMK; and transmit an association response frame to the initiating entity via the wireless interface, wherein the association response frame is encrypted with at least part of the PTK derived by the responding entity from the PMK.

Example 32 includes the responding entity of Example 31, wherein the responding entity is a non-Access Point (AP) Station (STA) or a non-AP Multi-Link Device (MLD), and the initiating entity is an AP STA or an AP MLD.

Example 33 includes the responding entity of Example 31, wherein the first random number is comprised within a private connection element or an enhanced privacy element of the first open authentication frame, and the second random number is comprised within a private connection element or an enhanced privacy element of the second open authentication frame.

Example 34 includes the responding entity of Example 31, wherein the first random number is a first ephemeral public key and the second random number is a second ephemeral public key.

Example 35 includes the responding entity of Example 34, wherein the processor circuitry is further configured to: derive the PTK from the PMK based on a Media Access Control (MAC) address of the initiating device, a MAC address of the responding entity, and a shared secret derived from ephemeral key exchange between the initiating entity and the responding entity.

Example 36 includes the responding entity of Example 31, wherein the second open authentication frame further comprises the first random number, and the first random number and the second random number are comprised within a same information element of the second open authentication frame.

Example 37 includes the responding entity of Example 31, wherein at least one of the association request frame and the association response frame also comprises the first random number and the second random number.

Example 38 includes the responding entity of Example 37, wherein the first random number and the second random number are comprised within a same information element of the at least one of the association request frame and the association response frame.

Example 39 includes the responding entity of Example 38, wherein the first random number and the second random number are comprised within a private connection element or an enhanced privacy element of the at least one of the association request frame and the association response frame.

Example 40 includes the responding entity of Example 31, wherein the processor circuitry is further configured to: derive the PTK from the PMK based on a Media Access Control (MAC) address of the initiating device, a MAC address of the responding entity, the first random number and the second random number.

Example 41 includes the responding entity of Example 31, wherein the processor circuitry is further configured to: encrypt the association response frame with a key as part of the PTK, wherein the association request frame is also encrypted with the key as part of the PTK.

Example 42 includes the responding entity of Example 41, wherein the key is a connection key, a Key-Encrypting Key (KEK), a Key-Decrypting Key (KDK), a Temporal Key (TK), a KCK (Key Confirmation Key), or a Key derived from the KDK.

Example 43 includes the responding entity of Example 31, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 44 includes the responding entity of Example 31, wherein the processor circuitry is further configured to: decrypt the association request frame with at least part of the PTK.

Example 45 includes the responding entity of Example 44, wherein the processor circuitry is further configured to: upon receiving an acknowledgement of the association request frame from the initiating entity, implement data communication with the initiating entity.

Example 46 includes a computer readable storage medium storing instructions thereon, wherein the instructions, when executed by one or more processors, cause the one or more processors to: receive a first open authentication frame from an initiating entity, wherein the first open authentication frame comprises information that helps the responding entity to identify a Pairwise Master Key (PMK) and a first random number; transmit a second open authentication frame to the initiating entity via a wireless interface, wherein the second open authentication frame comprises a second random number; receive an association request frame from the initiating entity, wherein the association request frame is encrypted with at least part of a Pairwise Transient Key (PTK) derived by the initiating entity from the PMK; and transmit an association response frame to the initiating entity via the wireless interface, wherein the association response frame is encrypted with at least part of the PTK derived by the responding entity from the PMK.

Example 47 includes the computer readable storage medium of Example 46, wherein the responding entity is a non-Access Point (AP) Station (STA) or a non-AP Multi-Link Device (MLD), and the initiating entity is an AP STA or an AP MLD.

Example 48 includes the computer readable storage medium of Example 46, wherein the first random number is comprised within a private connection element or an enhanced privacy element of the first open authentication frame, and the second random number is comprised within a private connection element or an enhanced privacy element of the second open authentication frame.

Example 49 includes the computer readable storage medium of Example 46, wherein the first random number is a first ephemeral public key and the second random number is a second ephemeral public key.

Example 50 includes the computer readable storage medium of Example 49, wherein the instructions, when executed by the one or more processors, further cause the one or more processors to: derive the PTK from the PMK based on a Media Access Control (MAC) address of the initiating device, a MAC address of the responding entity, and a shared secret derived from ephemeral key exchange between the initiating entity and the responding entity.

Example 51 includes the computer readable storage medium of Example 46, wherein the second open authentication frame further comprises the first random number, and the first random number and the second random number are comprised within a same information element of the second open authentication frame.

Example 52 includes the computer readable storage medium of Example 46, wherein at least one of the association request frame and the association response frame also comprises the first random number and the second random number.

Example 53 includes the computer readable storage medium of Example 52, wherein the first random number and the second random number are comprised within a same information element of the at least one of the association request frame and the association response frame.

Example 54 includes the computer readable storage medium of Example 53, wherein the first random number and the second random number are comprised within a private connection element or an enhanced privacy element of the at least one of the association request frame and the association response frame.

Example 55 includes the computer readable storage medium of Example 46, wherein the instructions, when executed by the one or more processors, further cause the one or more processors to: derive the PTK from the PMK based on a Media Access Control (MAC) address of the initiating device, a MAC address of the responding entity, the first random number and the second random number.

Example 56 includes the computer readable storage medium of Example 46, wherein the instructions, when executed by the one or more processors, further cause the one or more processors to: encrypt the association response frame with a key as part of the PTK, wherein the association request frame is also encrypted with the key as part of the PTK.

Example 57 includes the computer readable storage medium of Example 56, wherein the key is a connection key, a Key-Encrypting Key (KEK), a Key-Decrypting Key (KDK), a Temporal Key (TK), a KCK (Key Confirmation Key), or a Key derived from the KDK.

Example 58 includes the computer readable storage medium of Example 46, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 59 includes the computer readable storage medium of Example 46, wherein the instructions, when executed by the one or more processors, further cause the one or more processors to: decrypt the association request frame with at least part of the PTK.

Example 60 includes the computer readable storage medium of Example 59, wherein the instructions, when executed by the one or more processors, further cause the one or more processors to: upon receiving an acknowledgement of the association request frame from the initiating entity, implement data communication with the initiating entity.

Example 61 includes a method used in an initiating entity, the method comprising: transmitting a first open authentication frame to a responding entity, wherein the first open authentication frame comprises information that helps the responding entity to identify a Pairwise Master Key (PMK) and a first random number; receiving a second open authentication frame from the responding entity, wherein the second open authentication frame comprises a second random number; transmitting an association request frame to the responding entity, wherein the association request frame is encrypted with at least part of a Pairwise Transient Key (PTK) derived by the initiating entity from the PMK; and receiving an association response frame from the responding entity, wherein the association response frame is encrypted with at least part of the PTK derived by the responding entity from the PMK.

Example 62 includes the method of Example 61, wherein the initiating entity is an Access Point (AP) Station (STA) or an AP Multi-Link Device (MLD), and the responding entity is a non-AP STA or a non-AP MLD.

Example 63 includes the method of Example 61, wherein the first random number is comprised within a private connection element or an enhanced privacy element of the first open authentication frame, and the second random number is comprised within a private connection element or an enhanced privacy element of the second open authentication frame.

Example 64 includes the method of Example 61, wherein the first random number is a first ephemeral public key and the second random number is a second ephemeral public key.

Example 65 includes the method of Example 64, further comprising: deriving the PTK from the PMK based on a Media Access Control (MAC) address of the initiating device, a MAC address of the responding entity, and a shared secret derived from ephemeral key exchange between the initiating entity and the responding entity.

Example 66 includes the method of Example 61, wherein the second open authentication frame further comprises the first random number, and the first random number and the second random number are comprised within a same information element of the second open authentication frame.

Example 67 includes the method of Example 61, wherein at least one of the association request frame and the association response frame also comprises the first random number and the second random number.

Example 68 includes the method of Example 67, wherein the first random number and the second random number are comprised within a same information element of the at least one of the association request frame and the association response frame.

Example 69 includes the method of Example 68, wherein the first random number and the second random number are comprised within a private connection element or an enhanced privacy element of the at least one of the association request frame and the association response frame.

Example 70 includes the method of Example 61, further comprising: deriving the PTK from the PMK based on a Media Access Control (MAC) address of the initiating device, a MAC address of the responding entity, the first random number and the second random number.

Example 71 includes the method of Example 61, further comprising: encrypting the association request frame with a key as part of the PTK, wherein the association response frame is also encrypted with the key as part of the PTK.

Example 72 includes the method of Example 71, wherein the key is a connection key, a Key-Encrypting Key (KEK), a Key-Decrypting Key (KDK), a Temporal Key (TK), a KCK (Key Confirmation Key), or a key derived from the KDK.

Example 73 includes the method of Example 61, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 74 includes the method of Example 61, further comprising: decrypting the association response frame with at least part of the PTK.

Example 75 includes the method of Example 61, further comprising: upon successfully decrypting the association response frame without discard, implementing data communication with the responding entity.

Example 76 includes a method used in a responding entity, the method comprising: receiving a first open authentication frame from an initiating entity, wherein the first open authentication frame comprises information that helps the responding entity to identify a Pairwise Master Key (PMK) and a first random number; transmitting a second open authentication frame to the initiating entity, wherein the second open authentication frame comprises a second random number; receiving an association request frame from the initiating entity, wherein the association request frame is encrypted with at least part of a Pairwise Transient Key (PTK) derived by the initiating entity from the PMK; and transmitting an association response frame to the initiating entity, wherein the association response frame is encrypted with at least part of the PTK derived by the responding entity from the PMK.

Example 77 includes the method of Example 76, wherein the responding entity is a non-Access Point (AP) Station (STA) or a non-AP Multi-Link Device (MLD), and the initiating entity is an AP STA or an AP MLD.

Example 78 includes the method of Example 76, wherein the first random number is comprised within a private connection element or an enhanced privacy element of the first open authentication frame, and the second random number is comprised within a private connection element or an enhanced privacy element of the second open authentication frame.

Example 79 includes the method of Example 76, wherein the first random number is a first ephemeral public key and the second random number is a second ephemeral public key.

Example 80 includes the method of Example 79, further comprising: deriving the PTK from the PMK based on a Media Access Control (MAC) address of the initiating device, a MAC address of the responding entity, and a shared secret derived from ephemeral key exchange between the initiating entity and the responding entity.

Example 81 includes the method of Example 76, wherein the second open authentication frame further comprises the first random number, and the first random number and the second random number are comprised within a same information element of the second open authentication frame.

Example 82 includes the method of Example 76, wherein at least one of the association request frame and the association response frame also comprises the first random number and the second random number.

Example 83 includes the method of Example 82, wherein the first random number and the second random number are comprised within a same information element of the at least one of the association request frame and the association response frame.

Example 84 includes the method of Example 83, wherein the first random number and the second random number are comprised within a private connection element or an enhanced privacy element of the at least one of the association request frame and the association response frame.

Example 85 includes the method of Example 76, further comprising: deriving the PTK from the PMK based on a Media Access Control (MAC) address of the initiating device, a MAC address of the responding entity, the first random number and the second random number.

Example 86 includes the method of Example 76, further comprising: encrypting the association response frame with a key as part of the PTK, wherein the association request frame is also encrypted with the key as part of the PTK.

Example 87 includes the method of Example 86, wherein the key is a connection key, a Key-Encrypting Key (KEK), a Key-Decrypting Key (KDK), a Temporal Key (TK), a KCK (Key Confirmation Key), or a Key derived from the KDK.

Example 88 includes the method of Example 76, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

Example 89 includes the method of Example 76, further comprising: decrypting the association request frame with at least part of the PTK.

Example 90 includes the method of Example 89, further comprising: upon receiving an acknowledgement of the association request frame from the initiating entity, implement data communication with the initiating entity.

Example 91 includes an initiating entity comprising means for implementing the method of any one of Examples 61-75.

Example 92 includes a responding entity comprising means for implementing the method of any one of Examples 76-90.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof

What is claimed is:

1. An initiating entity comprising processor circuitry configured to cause the initiating entity to:
    transmit a first open authentication frame to a responding entity, wherein the first open authentication frame comprises a first random number and information that helps the responding entity to identify a Pairwise Master Key (PMK);
    receive a second open authentication frame from the responding entity, wherein the second open authentication frame comprises a second random number;
    transmit an association request frame to the responding entity, wherein the association request frame is encrypted with at least part of a Pairwise Transient Key (PTK) derived by the initiating entity from the PMK based on the first random number and the second random number; and
    receive an association response frame from the responding entity, wherein the association response frame is encrypted with at least part of the PTK derived by the responding entity from the PMK based on the first random number and the second random number,
    wherein the initiating entity is a non-Access Point (AP) Station (STA) or a non-AP Multi-Link Device (MLD), and the responding entity is an AP STA or an AP MLD.

2. The initiating entity of claim 1, wherein the first random number is comprised within a private connection element or an enhanced privacy element of the first open authentication frame, and the second random number is comprised within a private connection element or an enhanced privacy element of the second open authentication frame.

3. The initiating entity of claim 1, wherein the first random number is a first ephemeral public key and the second random number is a second ephemeral public key.

4. The initiating entity of claim 3, wherein the processor circuitry is further configured to cause the initiating entity to:
    derive the PTK from the PMK based on a Media Access Control (MAC) address of the initiating entity, a MAC address of the responding entity, and a shared secret derived from the first ephemeral public key and the second ephemeral public key.

5. The initiating entity of claim 1, wherein the second open authentication frame further comprises the first random number, and the first random number and the second random number are comprised within a same information element of the second open authentication frame.

6. The initiating entity of claim 1, wherein at least one of the association request frame and the association response frame also comprises the first random number and the second random number.

7. The initiating entity of claim 6, wherein the first random number and the second random number are comprised within a same information element of the at least one of the association request frame and the association response frame.

8. The initiating entity of claim 7, wherein the first random number and the second random number are comprised within a private connection element or an enhanced privacy element of the at least one of the association request frame and the association response frame.

9. The initiating entity of claim 1, wherein the processor circuitry is further configured to cause the initiating entity to:
    derive the PTK from the PMK based on a Media Access Control (MAC) address of the initiating entity and a MAC address of the responding entity in addition to the first random number and the second random number.

10. The initiating entity of claim 1, wherein the processor circuitry is further configured to cause the initiating entity to:
    encrypt the association request frame with a key as part of the PTK, wherein the association response frame is also encrypted with the key as part of the PTK.

11. The initiating entity of claim 10, wherein the key is a connection key, a Key-Encrypting Key (KEK), a Key-Decrypting Key (KDK), a Temporal Key (TK), a KCK (Key Confirmation Key), or a key derived from the KDK.

12. The initiating entity of claim 1, wherein the association response frame comprises an information element, which comprises a sub information element to distribute one or more of a Group Temporal Key (GTK), a Integrity GTK (IGTK), a Beacon IGTK (BIGTK), or to distribute one or more of a Multi-Link Operation (MLO) GTK, a MLO IGTK, and a MLO BIGTK in different links.

13. The initiating entity of claim 1, wherein the processor circuitry is further configured to cause the initiating entity to:
    decrypt the association response frame with at least part of the PTK.

14. The initiating entity of claim 13, wherein the processor circuitry is further configured to cause the initiating entity to:

upon successfully decrypting the association response frame without discard, implement data communication with the responding entity.

15. A non-transitory computer readable storage medium storing instructions thereon, wherein the instructions, when executed by one or more processors of an initiating entity, cause the initiating entity to:
transmit a first open authentication frame to a responding entity, wherein the first open authentication frame comprises a first random number and information that helps the responding entity to identify a Pairwise Master Key (PMK);
receive a second open authentication frame from the responding entity, wherein the second open authentication frame comprises a second random number;
transmit an association request frame to the responding entity, wherein the association request frame is encrypted with at least part of a Pairwise Transient Key (PTK) derived by the initiating entity from the PMK based on the first random number and the second random number; and
receive an association response frame from the responding entity, wherein the association response frame is encrypted with at least part of the PTK derived by the responding entity from the PMK based on the first random number and the second random number,
wherein the initiating entity is a non-Access Point (AP) Station (STA) or a non-AP Multi-Link Device (MLD), and the responding entity is an AP STA or an AP MLD.

16. The non-transitory computer readable storage medium of claim 15, wherein the first random number is comprised within a private connection element or an enhanced privacy element of the first open authentication frame, and the second random number is comprised within a private connection element or an enhanced privacy element of the second open authentication frame.

17. The non-transitory computer readable storage medium of claim 15, wherein the first random number is a first ephemeral public key and the second random number is a second ephemeral public key.

18. The non-transitory computer readable storage medium of claim 17, wherein the instructions, when executed by the one or more processors, further cause the initiating entity to:
derive the PTK from the PMK based on a Media Access Control (MAC) address of the initiating entity, a MAC address of the responding entity, and a shared secret derived from the first ephemeral public key and the second ephemeral public key.

19. A responding entity comprising processor circuitry configured to cause the responding entity to:
receive a first open authentication frame from an initiating entity, wherein the first open authentication frame comprises a first random number and information that helps the responding entity to identify a Pairwise Master Key (PMK);
transmit a second open authentication frame to the initiating entity, wherein the second open authentication frame comprises a second random number;
receive an association request frame from the initiating entity, wherein the association request frame is encrypted with at least part of a Pairwise Transient Key (PTK) derived by the initiating entity from the PMK based on the first random number and the second random number; and
transmit an association response frame to the initiating entity, wherein the association response frame is encrypted with at least part of the PTK derived by the responding entity from the PMK based on the first random number and the second random number,
wherein the initiating entity is a non-Access Point (AP) Station (STA) or a non-AP Multi-Link Device (MLD), and the responding entity is an AP STA or an AP MLD.

20. The responding entity of claim 19, wherein the first random number is comprised within a private connection element or an enhanced privacy element of the first open authentication frame, and the second random number is comprised within a private connection element or an enhanced privacy element of the second open authentication frame.

21. The responding entity of claim 19, wherein the first random number is a first ephemeral public key and the second random number is a second ephemeral public key.

22. The responding entity of claim 21, wherein the processor circuitry is further configured to cause the responding entity to:
derive the PTK from the PMK based on a Media Access Control (MAC) address of the initiating entity, a MAC address of the responding entity, and a shared secret derived from the first ephemeral public key and the second ephemeral public key.

* * * * *